United States Patent
Thames et al.

(10) Patent No.: US 7,081,159 B2
(45) Date of Patent: Jul. 25, 2006

(54) SOY PROTEIN BASED ADHESIVE AND PARTICLEBOARD

(75) Inventors: Shelby F. Thames, Hattiesburg, MS (US); Boris G. Sankovich, Hattiesburg, MS (US); Jeanne N. Shera, Hattiesburg, MS (US); Robert B. Thompson, Petal, MS (US); Sharathkumar K. Mendon, Hattiesburg, MS (US); James M. Evans, Hattiesburg, MS (US)

(73) Assignee: The University of Southern Mississippi, Hattiesburg, MS (US)

(*) Notice: Subject to any disclaimer, the term of this patent is extended or adjusted under 35 U.S.C. 154(b) by 0 days.

(21) Appl. No.: 11/083,118

(22) Filed: Mar. 17, 2005

(65) Prior Publication Data

US 2005/0234156 A1    Oct. 20, 2005

Related U.S. Application Data

(60) Provisional application No. 60/554,661, filed on Mar. 19, 2004.

(51) Int. Cl.
C09J 189/00    (2006.01)

(52) U.S. Cl. ............... 106/137.7; 106/137.71; 106/123.12; 106/149.1; 106/156.23; 106/157.1

(58) Field of Classification Search ............ 106/137.7, 106/137.71, 123.12, 149.1, 156.23, 157.1
See application file for complete search history.

(56) References Cited

U.S. PATENT DOCUMENTS

| | | | | |
|---|---|---|---|---|
| 1,726,510 A | * | 8/1929 | Cone et al. ............... 106/157.1 |
| 2,411,557 A | | 11/1946 | Schuh et al. .................. 260/57 |
| 3,392,038 A | * | 7/1968 | Teyral ........................ 106/614 |
| 3,432,319 A | | 3/1969 | Jakaitis et al. ............. 106/170 |
| 3,891,738 A | | 6/1975 | Shen .......................... 264/101 |
| 4,492,729 A | | 1/1985 | Bannerman et al. ........ 428/283 |
| 4,752,637 A | | 6/1988 | Israel ......................... 524/702 |
| 5,523,293 A | | 6/1996 | Jane et al. .................... 514/21 |
| 5,605,152 A | | 2/1997 | Slate et al. ................. 128/634 |
| 5,607,633 A | | 3/1997 | Sleeter et al. .............. 264/115 |
| 5,710,190 A | | 1/1998 | Jane et al. .................. 521/102 |
| 5,817,381 A | | 10/1998 | Chen et al. ................ 423/34.8 |
| 5,942,058 A | | 8/1999 | Sleeter et al. ............. 156/62.2 |
| 5,942,174 A | | 8/1999 | Thole et al. ................. 264/83 |
| 6,083,623 A | | 7/2000 | Stofko ........................ 428/403 |
| 6,132,885 A | | 10/2000 | Peek et al. .................. 428/485 |
| 6,497,760 B1 | | 12/2002 | Sun et al. ................. 106/131.1 |
| 6,790,271 B1 | * | 9/2004 | Thames et al. .......... 106/148.1 |

* cited by examiner

Primary Examiner—David Brunsman
(74) Attorney, Agent, or Firm—Howrey LLP

(57) ABSTRACT

An adhesive composition that can be used in particleboards and other composites is formed from an aqueous mixture of soy protein, zinc sulfate heptahydrate, calcium oxide, sodium benzoate, pine oil, wax emulsion and non-sulfonated kraft lignin. In a second embodiment the composition further includes an acid.

31 Claims, 1 Drawing Sheet

Percent average loss versus time for UF particleboard and particleboards prepared with soy protein-based adhesive.

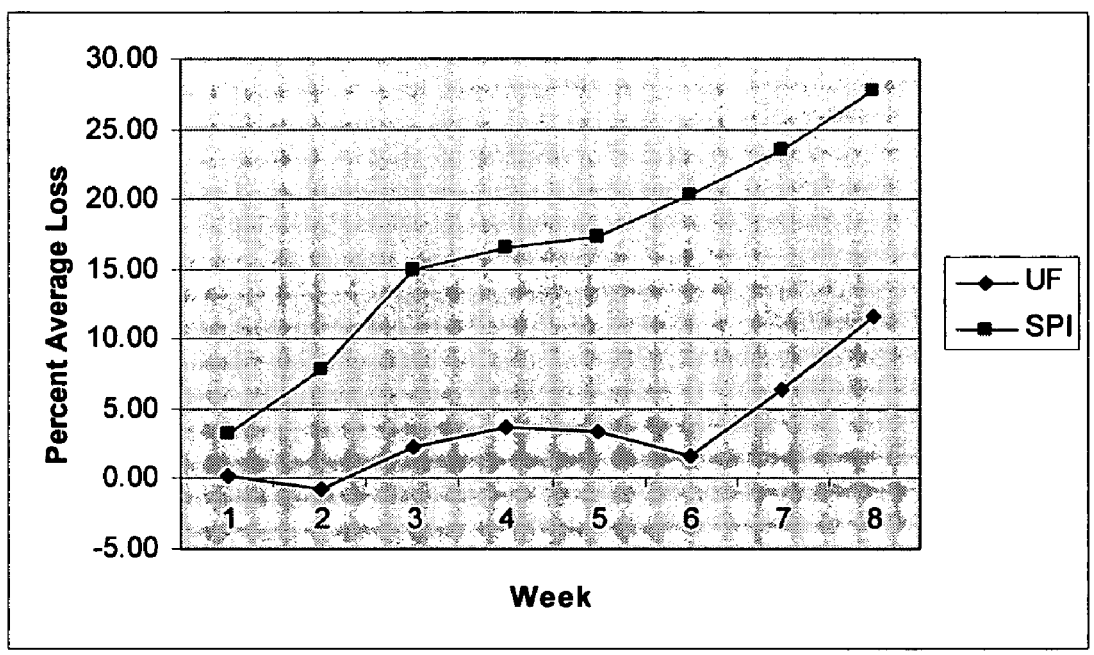
Figure 1. Percent average loss versus time for UF particleboard and particleboards prepared with soy protein-based adhesive.

SOY PROTEIN BASED ADHESIVE AND PARTICLEBOARD

BACKGROUND OF THE INVENTION

This application claims the benefit of provisional application Ser. No. 60/554,661 filed Mar. 19, 2004.

The present invention is directed to soy protein-based adhesives useful in the manufacture of particleboard and other composites. The present invention is also directed to particleboards made with such adhesives.

Soy protein was used as an adhesive ingredient in plywood in the early 1900s. However, the problem of low moisture resistance led to its replacement with petroleum-based resins in the 1930s. Particleboard composites were subsequently developed that utilized urea-formaldehyde, phenol formaldehyde or polymeric methylene diisocyanate resins to bind the wood particles rather than agricultural adhesives.

However, increasing environmental awareness and the recognized hazards of formaldehyde-based adhesives has created a strong demand for more environmentally friendly wood adhesives. Successful replacement of urea formaldehyde resins in particleboard requires an adhesive that can produce composites having characteristics matching or exceeding those attainable with urea formaldehyde. Accordingly, water resistance is a necessary characteristic of any suitable replacement.

Soybean proteins are a combination of 18 amino acids of wide chemical diversity such as amines, carboxylic acids, hydroxyls, and mercaptan functionalities. Each of these functionalities is polar in nature and contributes to water sensitivity. Accordingly, in order to use soy protein as an effective adhesive, it is necessary to counteract and overcome this sensitivity. Additionally, the soybean binder must be chemically transformed into a hydrophobic adhesive without creating toxic by-products and/or waste streams.

Commercial particleboards are constructed in a range of thicknesses and are designed to have high-density surfaces and low-density cores so as to maximize strength while minimizing weight. Panel thickness for particleboards generally range from ½1 inches with ⅝ and ¾ inches being the most common thicknesses in the industry. Particleboard is classified and evaluated according to the ANSI A208.1 requirements and ASTM D-1037 tests are used to determine the physical strength and water resistance properties.

Particleboards are formed by mixing together wood furnish and an adhesive binder and treating the mixture under high temperatures and pressures in a press. Generally, binder concentrations of 7–10% are used to make particleboard. Accordingly, the wood furnish is considered to be spot welded together rather than imbedded within the adhesive. Consequently, the ASTM D-1037 test results often exhibit a coefficient of variance in excess of 10%.

In view of the foregoing, it would be a significant advancement in the art to provide an agriculturally-based adhesive that could be utilized to replace urea formaldehyde resins in particleboard and other composites. It would be a further advancement in the art if such an adhesive was primarily based upon renewable resources. Such an adhesive as well as particleboards made from these adhesives are disclosed and claimed herein.

SUMMARY OF THE INVENTION

In a preferred embodiment, the present invention is directed to an adhesive formulation comprising a mixture of any of the following in combination or in the absence of certain components depending upon the level of desired end performance, water, zinc sulfate heptahydrate, calcium oxide, sodium benzoate, pine oil, soy protein, wax emulsion, and non-sulfonated kraft lignin. The adhesive is mixed with wood furnish or another source of lignocellulose to form particleboards and other composites.

BRIEF DESCRIPTION OF THE DRAWINGS

FIG. 1 is a plot of percent average weight loss versus time for conventional particleboards and particleboards of the present invention.

DETAILED DESCRIPTION

The adhesive formulations of the present invention are an aqueous mixture of soy protein such as soy protein isolate (SPI) or defatted soy flour (DSF), a crosslinking agent such as zinc sulfate heptahydrate, a hydrolyzation agent such as calcium oxide, sodium hydroxide, or ammonia, a preservative such as sodium benzoate, a defoamer such as pine oil, a wax emulsion to provide water resistance, and a source of lignin such as non-sulfonated kraft lignin or ammonium lignosulfonate. Suitable wax emulsions include the Cascowax EW series from Borden Chemical.

The adhesive formulation is mixed with a source of lignocellulose such as wood furnish to form particleboards or other composites. Additional ingredients such as calcium silicate, rice hulls, carbon black, and kenaf fiber can be used as fillers in the composites.

In a preferred embodiment, the adhesive formulation of the present invention comprises a mixture of water, zinc sulfate heptahydrate, calcium oxide, sodium benzoate, pine oil, soy protein isolate or defatted soy flour, wax emulsion and non-sulfonated kraft lignin. In a second embodiment the mixture further comprises an acid such as nitric, acetic, sulfuric or hydrochloric acid. The preferred acid is nitric acid.

Preferably the mixture comprises 50–80% by weight water, 0.10–0.25% zinc sulfate heptahydrate, 0.7–1.6% calcium oxide, 1.0–1.4% sodium benzoate, 0.3–0.8% pine oil, 14–25% soy protein isolate or defatted soy flour, 3.0–5.0% wax emulsion, and 1.0–2.0% non-sulfonated kraft lignin. If nitric acid is included, it preferably comprises 2.0–4.0 weight percent.

EXAMPLES 1–3

For the adhesive shown in Example 1, a water bath is heated to 40° C. and a 4 L reaction kettle is charged with 2571.0 grams of water. 4.90 grams of zinc sulfate heptahydrate, 33.1 grams of calcium oxide, 33.1 grams of sodium benzoate, and 17.8 grams of pine oil are then added to the reaction kettle. The reaction kettle lid is fitted with a four-propeller stirrer, a thermometer, rubber septum, and clamp. The lid is then securely attached to the kettle and the kettle is submerged in the 40° C. bath. The stirrer is attached to a mechanical stirring motor and the contents of the kettle are stirred for five minutes at 600 rpm. Approximately 400 grams of SPI are added over the course of 20 minutes. The mixture is allowed to homogenize for approximately 30 minutes and 92.7 additional grams of SPI are added. The mixture is allowed to react for an additional 60 minutes. Next, 101.7 grams of wax emulsion are added and allowed to homogenize with the reaction mixture for five minutes. Finally, 34.7 grams of non-sulfonated kraft lignin are added to the reaction kettle and allowed to homogenize. This process takes approximately 15 minutes. Upon complete incorporation of the lignin, the adhesive is removed from the water bath. Approximately 3.3 kg of adhesive are made in each batch. The adhesive is now ready to be combined with wood furnish for use in particleboard manufacture. The final composition of the adhesives is set forth in Table 1. The adhesives listed in Examples 2 and 3 have different compositions but were processed similar to Example 1.

TABLE 1

Composition of Non-Neutralized Adhesive

| Component | Example 1 Wt. % | Example 2 Wt. % | Example 3 Wt. % |
|---|---|---|---|
| Water | 78.17% | 70.45% | 76.66% |
| Zinc sulfate heptahydrate | 0.15% | 0.20% | 0.17% |
| Calcium oxide | 1.01% | 1.36% | 1.08% |
| Sodium benzoate | 1.01% | 1.36% | 1.08% |
| Pine oil | 0.54% | 0.73% | 0.59% |
| Soy protein isolate | 14.98% | 20.28% | 16.08% |
| Wax emulsion | 3.09% | 4.19% | 3.21% |
| Non-sulfonated kraft lignin | 1.06% | 1.43% | 1.13% |

A high speed Henschel blender is used to blend 1536.2 grams of the adhesive from Example 1 with 1922.1 grams wood furnish for the face material and the adhesive/face material mixture is emptied into a large tared box. This process is repeated for the core material using 1853.3 grams of adhesive and 1839.1 grams of wood furnish. The desired moisture loss is calculated for both the face and core materials and the boxes are placed in an oven to dry to moisture contents of 25% and 9%, respectively. The adhesive/face mixture after drying weighed 2442 grams while the adhesive/core mixture after drying weighed 1998 grams. The adhesive/face mixture was split into two equal parts. Particleboard made with adhesive 1 is designated as Particleboard 1.

A three-layer particleboard is prepared atop a parchment paper lined stainless steel plate. A wooden frame provides support during the process of laying out the mat. In order to insure an optimum density distribution, a leveler is used to evenly spread the material across the surface of the plate. The first face layer is followed by the core layer, and then the second face layer which is the top of the mat. The top is covered with parchment paper. Aluminum stops are placed in the press and the mat is slid into the press. The press is closed on the mat for 5.5 minutes at approximately 2700 psi and a platen temperature of 173° C. The press decompresses automatically and the particleboard is quickly removed from the press.

Particleboard 2 is formed by the same process but uses 1134.2 grams of adhesive 2 with 1922.2 grams of wood furnish for the adhesive/face mixture and 1368.4 grams of adhesive 2 with 1851.1 grams of wood furnish for the adhesive/core mixture.

Particleboard 3 is formed by the same process but uses 2868.8 grams of adhesive 3 with 1598.8 grams of wood furnish for the adhesive/face mixture and 3461.0 grams of adhesive 3 with 1449.0 grams of wood furnish for the adhesive/core mixture.

Mechanical and physical properties of Particleboards 1–3 are set forth in Table 2.

TABLE 2

Mechanical and Physical Properties Summary

| Particleboard | Density (lb/ft$^3$) | Thickness (inches) | MOR (psi) | MOE (psi) | MC (%) | ΔT* (%) | ΔW* (%) |
|---|---|---|---|---|---|---|---|
| 1 | 50.67 | 0.54 | 2764 | 526033 | 5.02 | 7.7 | 21.6 |
| 2 | 52.23 | 0.52 | 2847 | 506378 | 5.87 | 6.2 | 18.9 |
| 3 | 52.63 | 0.52 | 2153 | 504113 | 7.24 | 4.9 | 15.9 |

*Change in thickness (T) and weight (W) after 24 hours soaking in water.
MOR Modulus of Rupture
MOE Modulus of Elasticity
MC Moisture Content

EXAMPLES 4–6

For the adhesive shown in Example 4, a water bath is heated to 40° C. and a 4 L reaction kettle equipped with a stirrer and a thermometer is immersed in it. The kettle is charged with 2780.6 grams of water and stirred slowly for 15 minutes. The agitation is increased to 600 rpm and 35.7 grams of calcium oxide is added slowly. The kettle is then serially charged with 5.4 grams of zinc sulfate heptahydrate, 35.7 grams of sodium benzoate, and 19.3 grams of pine oil. The contents are stirred for five minutes before slowly adding 532.8 grams of SPI over 50 minutes. The mixture is stirred for an hour and 110.0 grams of wax emulsion is added slowly followed by 37.5 grams of non-sulfonated kraft lignin. The mixture is homogenized for 15 minutes, and the kettle is transferred to another water bath at ambient conditions for cooling. The agitation is increased to 1800 rpm and 80.0 grams of concentrated nitric acid is added over the next 30 minutes. The adhesive is now ready to be combined with wood furnish for use in particleboard manufacture. The final composition of the adhesives is set forth in Table 3. Examples 5–6 have different compositions but are processed similarly. The water bath temperature for adhesives 5 and 6 was increased to 65° C.

TABLE 3

Neutralized Adhesive Compositions

| Component | Example 4 Weight % | Example 5 Weight % | Example 6 Weight % |
|---|---|---|---|
| Water | 76.45 | 70.36 | 64.43 |
| Zinc sulfate heptahydrate | 0.15 | 0.19 | 0.22 |
| Calcium oxide | 0.98 | 1.24 | 1.48 |
| Sodium benzoate | 0.98 | 1.24 | 1.48 |
| Pine oil | 0.53 | 0.67 | 0.80 |
| Soy protein isolate | 14.65 | 18.44 | 22.13 |
| Wax emulsion | 3.02 | 3.81 | 4.57 |
| Non-sulfonated kraft lignin | 1.03 | 1.30 | 1.56 |
| Nitric acid | 2.20 | 2.77 | 3.32 |

These adhesives maintained their viscosity for 91 days after synthesis. Industry standard for these adhesives is 3-weeks stability. Therefore, the adhesive of the present invention exceeds the industry standards for storage stability.

A high speed Henschel blender is used to blend 1963.4 grams of the adhesive from Example 4 with 1513.5 grams wood furnish for the face material and the mixture is emptied into a large tared box. This process is repeated for the core material using 1858.1 grams of adhesive and 1826.0 grams of wood furnish. The boxes are placed in an oven to dry to moisture contents of 25% and 9%, respectively. The adhesive/face mixture after drying weighed 2778 grams while the adhesive/core mixture after drying weighed 2270 grams. The adhesive/face mixture is split into two equal parts. Particleboard made with adhesive 4 is designated as particleboard 4.

A three-layer particleboard is prepared atop a parchment paper lined stainless steel plate. A wooden frame provides support during the process of forming the mat. A leveler is used to evenly spread the material across the plate surface and ensure optimum density distribution. The first face layer is followed by the core layer, and then the second face layer which is the top of the mat. The top is covered with parchment paper. Aluminum stops are placed in the press and the mat is slid into the press. The press is closed on the mat for 5.5 minutes at about 2700 psi and a platen temperature of 173° C. The press decompresses automatically and the particleboard is quickly removed from the press.

Particleboard 5 is formed by the same process but uses 1203.0 grams of adhesive 2 with 1922.2 grams of wood furnish for the adhesive/face mixture and 1451.0 grams of adhesive 5 with 1839.1 grams of wood furnish for the adhesive/core mixture.

Particleboard 6 is formed by the same process but uses 1001.88 grams of adhesive 3 with 1922.2 grams of wood furnish for the adhesive/face mixture and 1208.6 grams of adhesive 6 with 1839.1 grams of wood furnish for the adhesive/core mixture.

Mechanical and physical properties of particleboards 4–6 are shown in Table 4.

TABLE 4

Mechanical and Physical Properties Summary

| Particleboard | Density lb/ft$^3$ | Thickness inches | MOR psi | MOE psi | MC % | ΔT* % | ΔW* % |
|---|---|---|---|---|---|---|---|
| 4 | 49.6 | 0.53 | 2593 | 438225 | 6.7 | 4.8 | 12.5 |
| 5 | 49.8 | 0.53 | 2540 | 462479 | 6.5 | 3.9 | 10.5 |
| 6 | 49.6 | 0.53 | 2403 | 428896 | 5.4 | 3.4 | 11.7 |

*Change in thickness (T) and weight (W) after 24 hours soaking in water.

EXAMPLE 7

An adhesive composition was prepared in the same manner as Example 5 except that defatted soy flour was used in place of the soy protein isolate. The final composition of the adhesive is set forth in Table 3a.

TABLE 3a

Neutralized Adhesive Made with Defatted Soy Flour

| Component | Example 7 Weight % |
|---|---|
| Water | 70.36 |
| Zinc sulfate heptahydrate | 0.19 |
| Calcium oxide | 1.24 |
| Sodium benzoate | 1.24 |
| Pine oil | 0.67 |
| Defatted soybean flour | 18.44 |
| Wax emulsion | 3.81 |
| Non-sulfonated kraft lignin | 1.30 |
| Nitric acid | 2.77 |

Two three-layer particleboards were prepared in the same manner as Example 5 but using the adhesive of Example 7. The mechanical and physical properties of particleboards 7a and 7b are shown in Table 4a.

TABLE 4a

Mechanical and Physical Properties Summary

| Particleboard | Density lb/ft$^3$ | MC % | MOR psi | MOE psi | TS % | WA % |
|---|---|---|---|---|---|---|
| 7a | 49.7 | 6.0 | 1873 | 409560 | 5.5 | 12.3 |
| 7b | 49.6 | 5.4 | 1848 | 412233 | 5.6 | 12.7 |

EXAMPLE 8 and 9

A series of particleboards were made using the adhesive and method of Example 5. The particleboards were tested for five properties (Internal bond IB, Face pull FP, Hardness H, Screwholding face SHF, and Screwholding edge SHE) following ANSI A208.1 specifications and the results are listed below in Table 5.

TABLE 5

Mechanical Properties of SPI particleboards

| | IB psi | FP psi | H pounds | SHF psi | SHE % |
|---|---|---|---|---|---|
| ¾" Particleboard 8 | 86.8 | 260 | 1048 | 281 | 220 |
| ⅞" Particleboard 9 | 57.0 | 290 | 835 | 277 | 158 |

Applications of Soy Protein Based Composite Boards

DSF particleboards meet M1 and MS particleboard requirements while SPI particleboards exceed the requirements of M1, M2, M3 and MS grades. Particleboard applications include furniture, cabinets, subflooring in manufactured housing, door cores, laminate flooring, stair treads, and shelving. Most kitchen cabinets have particleboard shelves, sides, backs, drawers, doors and/or other parts. Particleboard grades M-S, M-2, and M-3 are used in kitchen and vanity cabinets. Industrial particleboard grades used in office and residential furniture, kitchen cabinets, case goods and other applications are typically ANSI 208.1 grades M-S, M-2, or M-3. Countertops and shelving applications also require particleboards passing M-2 grade as per ANSI 208.1.

Biodegradation Testing of Adhesives and Particleboards

Soy protein-based adhesive from Example 1 was tested for biodegradability in marine environments following ASTM D 6691-01. Adhesive films were developed by heating at 165° C. under 50 tons of pressure to simulate pressing conditions. Unprocessed SPI was used as a control. Biodegradation was evaluated by determining percent mineralization and the micromoles of carbon dioxide evolved. Table 6 reports the results of the marine respirometry test.

TABLE 6

Marine Respirometry Test Results

| Sample Description | Total $CO_2$ (μmoles) | % Mineralization |
|---|---|---|
| Soy protein isolate | 400 | 60 |
| Cured soy protein-based adhesive | 200 | 30 |

The data indicates that the cured soy protein-based adhesive will degrade well in a marine environment.

Soil biodegradation of particleboard 1 was tested following a modified version of AATCC TM 30-1999. Rough nominal ½" three-layer particleboards were cut into 1½"× 1½" blocks. Commercial particleboards manufactured with urea formaldehyde (UF) resin were used as a control, and particleboard blocks prepared with soy protein-based adhesive were tested for degradation in soil. Samples of the boards tested for soil biodegradability were evaluated for MOR and MOE. The results of mechanical and physical testing are reported in Table 7.

TABLE 7

Mechanical and Physical Properties of UF and Soy Protein-based Adhesive Particleboards for Soil Burial Testing

| | Density lb/ft$^3$ | MOR psi | MOE psi | ΔT* % | ΔW* % |
|---|---|---|---|---|---|
| SPI board | 49.3 | 2155 | 465000 | 4.5 | 18.6 |
| UF board | 45.5 | 1695 | 315000 | 3.5 | 13.2 |

Each block was weighed prior to burial. Every week, three blocks were removed from the soil and allowed to air-dry for 72 hours. The blocks were then weighed to calculate the percent average loss. The test was continued for eight weeks. Percent average loss versus time for both types of particleboards is plotted in FIG. 1.

Particleboards that contained soy protein-based adhesive lost an average of 27.9% of their total weight while particleboards manufactured with UF resin lost an average of 11.6%, indicating that the soybean protein-based particleboards biodegrade faster than commercial particleboards in soil.

While the invention has been described with respect to the presently preferred embodiments, it will be appreciated by those skilled in the art that variations can be employed and still achieve satisfactory results. Accordingly, the invention is defined by the appended claims rather than the foregoing description.

What is claimed:

1. An adhesive formulation comprising of a mixture of: water; zinc sulfate heptahydrate; calcium oxide; sodium benzoate; pine oil; soy protein; wax emulsion; and non-sulfonated kraft lignin.

2. The adhesive formulation of claim 1 wherein the soy protein is soy protein isolate.

3. The adhesive formulation of claim 1 wherein the soy protein is defatted soy flour.

4. The adhesive formulation of claim 1 further comprising an acid.

5. The adhesive formulation of claim 4 wherein the acid is nitric acid.

6. The adhesive formulation of claim 5 comprising 45–80% water; 0.15–0.25% zinc sulfate heptahydrate; 0.7–1.6% calcium oxide; 1.0–1.4% sodium benzoate; 0.30–0.80% pine oil; 14–25% soy protein isolate; 3.0–5.0% wax emulsion; 1.0–2.0% non-sulfonated kraft lignin, and 2.0–4.0% nitric acid.

7. The adhesive formulation of claim 6 comprising 76.45% water; 0.15% zinc sulfate heptahydrate; 0.98% calcium oxide; 0.98% sodium benzoate; 0.53% pine oil; 14.65% soy protein isolate; 3.02% wax emulsion; 1.03% non-sulfonated kraft lignin, and 2.20% nitric acid.

8. The adhesive formulation of claim 6 comprising 70.36% water; 0.19% zinc sulfate heptahydrate; 1.24% calcium oxide; 1.24% sodium benzoate; 0.67% pine oil; 18.44% soy protein isolate; 3.81% wax emulsion; 1.30% non-sulfonated kraft lignin, and 2.77% nitric acid.

9. The adhesive formulation of claim 5 comprising 64.43% water; 0.22% zinc sulfate heptahydrate; 1.48% calcium oxide; 1.48% sodium benzoate; 0.80% pine oil; 22.13% soy protein isolate; 4.57% wax emulsion; 1.56% non-sulfonated kraft lignin, and 3.32% nitric acid.

10. The adhesive formulation of claim 1 comprising 50–85% water; 0.10–0.25% zinc sulfate heptahydrate; 0.7–1.6% calcium oxide; 1.0–1.4% sodium benzoate; 0.30–0.75% pine oil; 14–25% soy protein; 3.0–4.2% wax emulsion; and 1.0–1.5% non-sulfonated kraft lignin.

11. The adhesive formulation of claim 10 comprising 78.17% water; 0.15% zinc sulfate heptahydrate; 1.01% calcium oxide; 1.01% sodium benzoate; 0.54% pine oil; 14.98% soy protein isolate; 3.09% wax emulsion; and 1.06% non-sulfonated kraft lignin.

12. The adhesive formulation of claim 10 comprising 70.45% water; 0.20% zinc sulfate heptahydrate; 1.36% calcium oxide; 1.36% sodium benzoate; 0.73% pine oil; 20.28% soy protein isolate; 4.19% wax emulsion; and 1.43% non-sulfonated kraft lignin.

13. The adhesive formulation of claim 10 comprising 76.66% water; 0.17% zinc sulfate heptahydrate; 1.08% calcium oxide; 1.08% sodium benzoate; 0.59% pine oil; 16.08% soy protein isolate; 3.21% wax emulsion; and 1.13% non-sulfonated kraft lignin.

14. An adhesive formulation comprising of an aqueous mixture of: a source of soy protein; a crosslinker; a hydrolyzation agent; a preservative; a defoamer; a wax emulsion; and a source of lignin.

15. The adhesive formulation of claim 14 further comprising an acid.

16. The adhesive formulation of claim 15 wherein the acid is nitric acid.

17. A particleboard comprising of: a source of lignocellulose; and a binder comprising a mixture of water, zinc sulfate heptahydrate, calcium oxide, sodium benzoate, pine oil, soy protein, wax emulsion and non-sulfonated kraft lignin.

18. The particleboard of claim 17 wherein the soy protein is soy protein isolate.

19. The particleboard of claim 17 wherein the soy protein is defatted soy flour.

20. The particleboard of claim 17 wherein the source of lignocellulose is wood furnish.

21. The particleboard of claim 17 wherein the binder is comprised of: 50–85% water; 0.15–0.25% zinc sulfate heptahydrate; 0.7–1.6% calcium oxide; 1.0–1.4% sodium benzoate; 0.30–0.75% pine oil; 14–25% soy protein isolate; 3.0–4.2% wax emulsion; and 1.0–1.5% non-sulfonated kraft lignin.

22. The particleboard of claim 21 wherein the binder is comprised of: 78.17% water; 0.15% zinc sulfate heptahydrate; 1.01% calcium oxide; 1.01% sodium benzoate; 0.54% pine oil; 14.98% soy protein isolate; 3.09% wax emulsion; and 1.06% non-sulfonated kraft lignin.

23. The particleboard of claim 21 wherein the binder is comprised of: 70.45% water; 0.20% zinc sulfate heptahydrate; 1.36% calcium oxide; 1.36% sodium benzoate; 0.73% pine oil; 20.28% soy protein isolate; 4.19% wax emulsion; and 1.43% non-sulfonated kraft lignin.

24. The particleboard of claim 21 wherein the binder is comprised of: 76.66% water; 0.17% zinc sulfate heptahydrate; 1.08% calcium oxide; 1.08% sodium benzoate; 0.59% pine oil; 16.08% soy protein isolate; 3.21% wax emulsion; and 1.13% non-sulfonated kraft lignin.

25. The particleboard of claim 17 wherein the binder further comprises an acid.

26. The particleboard of claim 25 wherein the acid is nitric acid.

27. The particleboard of claim 26 wherein the source of lignocellulose is wood furnish.

28. The particleboard of claim 26 wherein the binder is comprised of: 45–80% water; 0.15–0.25% zinc sulfate heptahydrate; 0.7–1.6% calcium oxide; 1.0–1.4% sodium benzoate; 0.30–0.80% pine oil; 14–25% soy protein isolate; 3.0–5.0% wax emulsion; 1.0–2.0% non-sulfonated kraft lignin, and 2.0–4.0% nitric acid.

29. The particleboard of claim 28 wherein the binder is comprised of: 76.45% water; 0.15% zinc sulfate heptahydrate; 0.98% calcium oxide; 0.98% sodium benzoate; 0.53% pine oil; 14.65% soy protein isolate; 3.02% wax emulsion; 1.03% non-sulfonated kraft lignin, and 2.20% nitric acid.

30. The particleboard of claim 28 wherein the binder is comprised of: 70.36% water; 0.19% zinc sulfate heptahydrate; 1.24% calcium oxide; 1.24% sodium benzoate; 0.67% pine oil; 18.44% soy protein isolate; 3.81% wax emulsion; 1.30% non-sulfonated kraft lignin, and 2.77% nitric acid.

31. The particleboard of claim 28 wherein the binder is comprised of: 64.43% water; 0.22% zinc sulfate heptahydrate; 1.48% calcium oxide; 1.48% sodium benzoate; 0.80% pine oil; 22.13% soy protein isolate; 4.57% wax emulsion; 1.56% non-sulfonated kraft lignin, and 3.32% nitric acid.

* * * * *